Oct. 1, 1940.   P. MOLE ET AL   2,216,352
ARC LAMP AND CONTROL MECHANISM THEREFOR
Filed Nov. 18, 1938   3 Sheets-Sheet 1
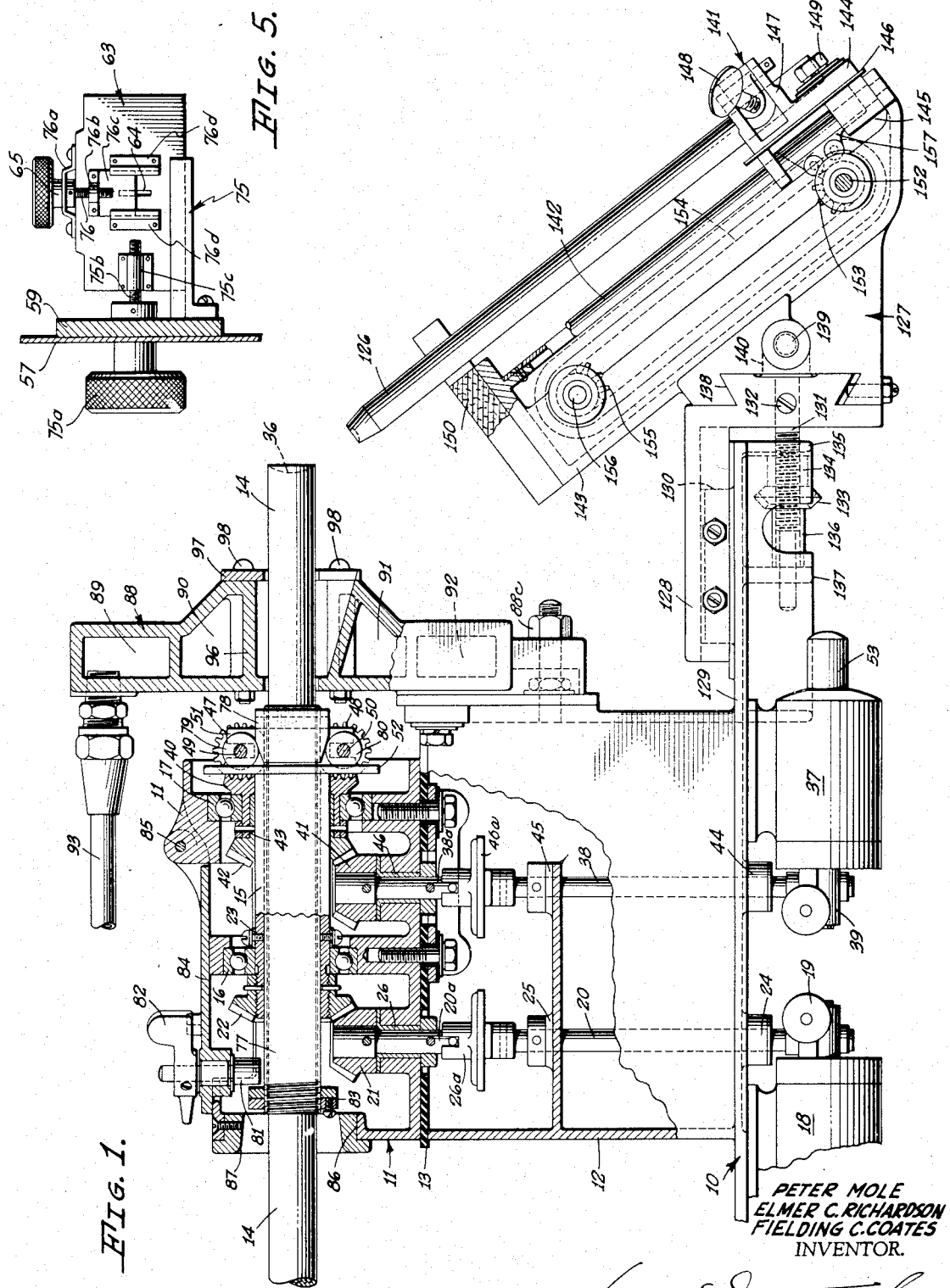
PETER MOLE
ELMER C. RICHARDSON
FIELDING C. COATES
INVENTOR.
BY Harold W. Mattingly
ATTORNEY.

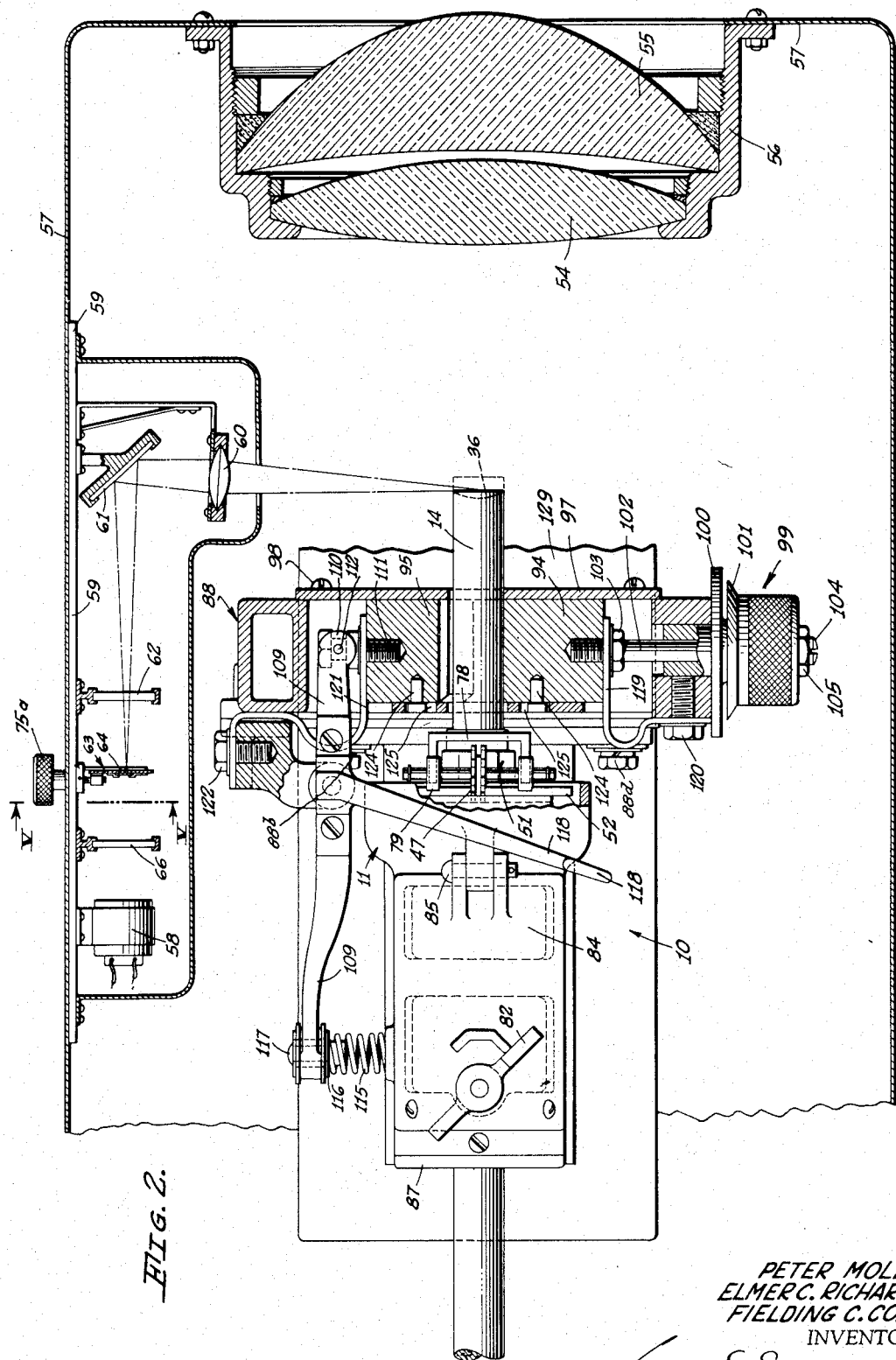

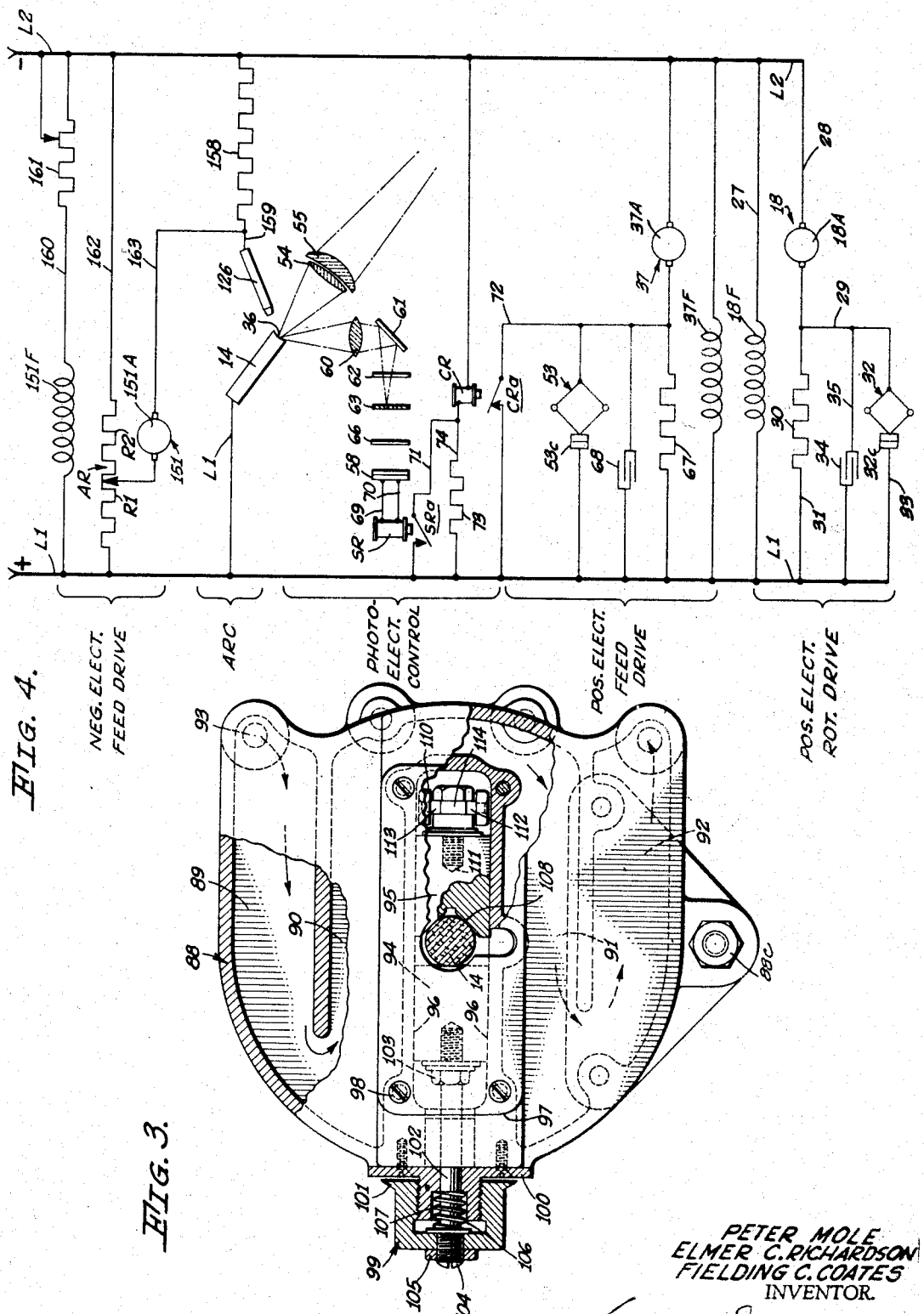

Patented Oct. 1, 1940

2,216,352

UNITED STATES PATENT OFFICE 2,216,352

ARC LAMP AND CONTROL MECHANISM THEREFOR

Peter Mole, Elmer C. Richardson, and Fielding C. Coates, Los Angeles, Calif., assignors to Mole-Richardson Co., Los Angeles, Calif., a limited partnership of California Application November 18, 1938, Serial No. 241,220

5 Claims. (Cl. 176—51)

Our invention relates to arc lamps and has particular reference to an arc lamp embodying control features adapting it particularly for such applications as the projection of colored motion picture films, and the like.

The recent major developments and improvements in connection with colored cinematography have given rise to numerous problems in connection with the projection of colored motion pictures and the lighting of motion picture sets.

One of the most perplexing problems regarding the use of arc lamps confronting the motion picture industry today is in connection with a process known in the trade as "back projection."

A great deal of difficulty has been encountered in the use of this process even in connection with the conventional "black and white" photography because of the lack of projection lamps having the ability of providing sufficient illumination of the required uniformity as regards quality and quantity of light. Whenever the picture is to be photographed in color, the problem becomes even more acute inasmuch as the fidelity of color rendition in the present commercial color photographic processes depends to a very large extent upon the uniformity of quality of light used for the projection of the colored background upon the translucent back projection screen.

As a result of the highly sensitive nature of the color films as respects quantity and quality of illumination, the quality of the light emitted by the crater of an arc lamp, and the location of this crater relative to the principal light projecting optical system included in the lamp, must be carefully controlled.

The control equipment for maintaining the proper relations as regards crater location, length of arc and current consumption by the lamp are at present not sufficiently accurate in their operation to insure constancy of results in that the power used by the arc varies beyond permissible limits and the mechanism for maintaining the location of the crater at a fixed point is not sufficiently sensitive in its operation and is too slow in response to changes in crater location.

It is therefore a primary object of our invention to provide such control mechanism for arc lamps as will insure the accurate maintenance of a uniform, high standard of quality and quantity of light projected by the lamp.

An additional object of our invention is to provide a control mechanism for an arc lamp for accurately and automatically maintaining the crater of the positive electrode at a fixed location relative to the principal light projecting system employed in the lamp.

It is also an object of our invention to provide an arc lamp of the character set forth, wherein an extremely sensitive and rapidly responsive photo-electric means is employed to maintain the crater of the positive electrode at a fixed location relative to the light projecting means.

Another additional object of our invention is to provide an arc lamp of the character set forth in the preceding paragraphs in which the sensitivity of the photo-electric control mechanism and the desired location of the crater relative to the light projecting means may be readily adjusted.

It is a further object of our invention to provide in an arc lamp which includes a photo-electric control mechanism of the character set forth a control mechanism for maintaining the power used by the arc at a specified fixed value and thereby maintain a uniform quality and quantity of light to be emitted by the lamp.

It is an additional object of our invention to provide an arc lamp of the character set forth in the preceding paragraphs with a novel brush mechanism for conveying the arc current to a rotating positive electrode.

Other objects and advantages of our invention will be apparent from a study of the following specifications, read in connection with the accompanying drawings, wherein:

Fig. 1 is a side elevation of one form of a projection type arc lamp constructed in accordance with our invention and with parts broken away to show parts of the mechanism in vertical, longitudinal section;

Fig. 2 is a fragmentary plan view, partly in section, of a projection type arc lamp showing the relation of the positive electrode holder, the light projecting means of the lamp, and the control mechanism for maintaining the positive crater at the proper location relative to the projecting means;

Fig. 3 is a front elevational view, partly in section, showing the upper portion of the positive electrode supporting and feeding mechanism when viewed from the approximate location of the optical system of the lamp;

Fig. 4 is a wiring diagram illustrating the arc circuit and the control circuits employed to establish the proper operating condition of the lamp; and Fig. 5 is a view taken as indicated by the line V–V of Fig. 2 to illustrate the construction of an adjustable slit device used with the control devices for regulating the crater location.

Referring to Fig. 1, the arc lamp comprising the preferred embodiment of our invention includes a base member 10 upon which is supported a gear housing 11 by means of a box-like supporting member 12 suitably attached to the housing 11 and to the base member 10 and insulated from the gear housing 11 by means of suitable insulating material 13 interposed between these members.

The gear housing 11 is adapted to rotatably and removably support a positive electrode 14 and is accordingly fitted with an electrode-receiving sleeve 15 which is journaled for axial rotation as by means of ball bearings 16 and 17 carried by suitable supporting means within the housing 11.

Rotary motion is imparted to the sleeve 15 and to the electrode 14 carried thereby by means of a motor 18 supported from the underside of the base 10 and coupled to the sleeve 15 by means of reduction gearing 19 interconnecting the motor 18 and upwardly extending interconnecting shafts 20 and 20a which are in turn coupled to the sleeve 15 by means of bevel gears 21 and 22. The gear ratios of the reduction gearing 19 and the bevel gears 21 and 22 are selected with respect to the speed of rotation of the motor 18 so as to deliver an optimum speed of rotation to the positive electrode 14.

In order that the sleeve 15 may be held against axial movement during the rotation thereof, we provide a thrust ring 23 which is suitably secured to the sleeve 15 in such a position as to engage one face of the inner race of the ball bearing 16, the other face of which engages a hub of the bevel gear 22.

The vertically extending shafts 20 and 20a which interconnect the motor 18 and the sleeve 15 may be journaled for rotation by suitable bearings 24, 25 and 26 provided in the base plate 10 and the supporting structure 12 and may be held against axial movement by means of suitable thrust collars and/or washers applied to the shafts 20 and 20a in positions engaging the previously described bearings. The shafts 20 and 20a may be interconnected by means of an insulating coupling 26a.

The motor 18 is preferably connected, as shown in Fig. 4, between line conductors L1 and L2 which are connected to a suitable source of power, together with a governing mechanism for causing the motor 18 to rotate at an essentially constant speed. This connection may include a circuit 27 which extends between the line conductors L1 and L2 and includes a field 18F of the motor 18. An armature 18A of the motor 18 is preferably connected by means of a conductor 28 to the line conductor L2, the other side of the armature 18A being connected by means of a conductor 29 to a speed limiting resistor 30 which is in turn connected to the line conductor L1 by means of a conductor 31. The armature current which flows through the circuits 28, 29 and 31 causes a voltage drop in the resistor 30 so as to apply a voltage across the armature 18A which is less than the voltage supplied by the conductors L1 and L2.

We include a governor mechanism 32 for the motor 18 which may be of the well known flyball type connected for rotation by the shaft of the motor 18 and which includes contacts 32c which are arranged to be opened by the mechanism 32 whenever the speed of rotation of the motor 18 reaches a predetermined value. In order that the opening of these contacts may be used to control the speed of rotation of the motor 18, we connect the contacts 32c in a circuit 33 which extends between the line conductor L1 and the previously described conductor 29 so that the contacts 32c are connected in parallel with the speed limiting resistor 30. It follows therefore that if contacts 32c are closed, full line voltage will be applied to the armature 18A and as the motor 18 accelerates the contacts 32c will open at a predetermined speed so as to insert the series resistor 30 in the armature circuit. The consequent reduction in the armature voltage will allow the motor 18 to tend to slow down, such slowing down being arrested by the reclosing of the contacts 32c. It follows therefore that the contacts 32c will rapidly open and close so as to maintain the speed of rotation of the motor 18 at a value corresponding to the speed at which the contacts 32c open.

We include a capacitor 34 in a shunt circuit 35 paralleling the contacts 32c so that the tendency for the current flowing through circuit 33 to persist during the opening operation of contacts 32c and cause arcing thereof and burning of the contact points will be absorbed by the capacitor 34 and provide long life, trouble-free operation of the governor mechanism 32.

During the operation of the lamp, the electrode 14 will be progressively consumed so that the electrode 14 should be fed forwardly toward the other electrode of the lamp if a crater 36 (see Fig. 1) which is formed in the end tnereof, is to be maintained in a fixed location relative to the optical system of the lamp. We therefore provide an electric motor 37 which is mechanically connected to the electrode 14 in such a manner as to cause the electrode 14 to be fed toward the other electrode in terms of its rate of consumption.

This mechanical connection may include interconnected vertical shafts 38 and 38a which are coupled to the electric motor 37 by means of suitable reduction gearing 39 and which is also coupled to a scroll gear 40 by means of bevel gears 41 and 42, the first of which is secured to the shaft 38a and the latter of which is secured to the scroll gear 40 by means of suitable interconnecting mechanism, such as pins 43 engaging the hubs thereof. The scroll gear 40 and the bevel gear 42 connected thereto are rotatably supported on the sleeve 15 and are disposed on opposite sides of the ball-bearing 17 so that axial movement of these gears along the sleeve 15 is prevented. The shafts 38 and 38a may be journaled for rotation by means of bearings 44, 45 and 46 carried by the base plate 10 and the supporting structure 12 and may be prevented from moving axially by means of suitable thrust collars and/or washers applied to the shafts 38 and 38a in relative positions to engage the aforementioned bearings. The vertical shafts 38 and 38a may be interconnected and insulated from each other by means of an insulating coupling 46a.

The rotation of the scroll gear 40, imparted thereto by the motor 37, may be converted to produce an advancing translatory movement of the electrode 14 by means of feeding wheels 47 and 48 which are supported upon a pair of axles 49 and 50 carried in slotted bearing brackets 51 attached to a face plate portion 52 of the sleeve 15. The feeding wheels 47 and 48 are preferably formed with gear teeth on their periphery arranged to engage the scroll teeth on the scroll gear 40 so that as the scroll gear 40 is rotated relative to the sleeve 15, the feeding wheels 47 and 48 will be rotated thereby and feed the electrode 14 in a forward, axial direction toward the other lamp electrode. Suitable tension springs (not shown) interconnect the axles 49 and 50 for normally urging the feeding wheels 47 and 48 into gripping engagement with the electrode 14.

We prefer to make the speed of rotation of the motor 37 and the gear ratio of the mechanical connection to the electrode feeding wheels 47 and 48 such that the electrode 14 will normally be fed forwardly toward the other lamp electrode at a rate slightly lower than its rate of consumption during the operation of the arc. In order that this speed of rotation of the motor 37 may be maintained, we provide a governing mechanism 53 which may be of conventional construction and supported by the frame of the motor 37 and coupled to the shaft thereof.

We provide a controlling mechanism for superseding the control applied by the governing mechanism 53 so as to accelerate the speed of the motor 37 in terms of the tendency of the crater 36 to recede from its proper or predetermined desired location relative to a principal light projecting means of the lamp which may include a pair of condensing or projection lenses 54 and 55 (see Fig. 2), supported in a suitable lens mount 56 from the lamp housing 57 which encloses the previously described mechanism. The control mechanism includes a photoelectric or photronic device 58 supported by a supporting plate 59 secured to the lamp housing 57 in such a position as to intersect a control beam of light transmitted from the crater 36 through a positive lens 60 and reflected by a mirror 61 so that changes in the intensity of illumination of the photo-electric device 58, as a result of movement of the crater 36 relative to the light projecting system, may vary the electrical characteristics thereof and effect a change in speed of the motor 37.

The lens 60 is preferably located with respect to the predetermined desired location of the crater 36 so that the crater 36, as viewed from the location of the lens 60, appears as a line or elongated ellipse and is therefore preferably located just slightly forward of a plane passing through the crater 36 and disposed at approximately a right angle to the optical axis of the lamp.

The mirror 61 is interposed between the lens 60 and the photo-electric device 58 so that the beam of light from the crater 36 may be turned into approximate parallelism with the side of the lamp housing 57 and provide a convenient compact arrangement of the photo-electric device 58 and a filter 62 and masking plate 63 associated therewith. The parts are preferably arranged relative to each other so that the light from the crater 36 first passes through the lens 60, is reflected by the mirror 61 and caused to pass through the filter 62, which removes the infra-red or heat rays, and fall upon the masking plate 63 which is so located so that the lens 60 forms a real image of the crater 36 upon the masking plate 63.

The masking plate 63 is provided with an adjustable orifice or slit 64, adjustment of the area of which is obtained by means of a control knob 65 (Fig. 5) so that manual adjustment may be made of the amount of light which can be passed by the slit 64, the light then passing through the slit 64 and through a diffusing screen 66 to impinge upon the photo-eletcric device 58. The diffusing screen 66 operates to so diffuse the light passing through the slit 64 and impinging upon the photo-electric device 58 as to reduce its concentration thereon to a point where danger of undesirable local heating or paralysis of the device 58 is obviated.

It will be readily apparent to those skilled in the art that the optical system just described constitutes an optical lever and valve arrangement which operates as if the beam of light travelling from the crater 36 were a lever pivoted at the optical center of the lens 60, and should the crater 36 be moved rearwardly from the position illustrated in Fig. 2, the beam of light will be caused to pivot about this pivot point and cause the real image of the crater 36 to move laterally relative to the slit 64. This lateral movement of the image of the crater 36 causes a part of said image to enter the slit 64 and transmit an increased quantity of light therethrough to impinge upon the photo-electric device 58.

In Fig. 4 we have illustrated diagrammatically one system of electric connections which may be employed with the photo-electric device 58 to provide the type of control previously described. A field winding 37F of the motor 37 is connected for constant excitation to the supply conductors L1 and L2 and an armature 37A of said motor is also connected between the supply conductors L1 and L2 in series relationship with a speed limiting resistor 67.

In order that the speed of the motor 37 may be maintained at a substantially constant, normal value, we connect contacts 53c of the governing mechanism 53 in a circuit paralleling the speed controlling resistor 67 and arranged these contacts in such a manner that whenever the speed of rotation of the motor 37 drops below a specified minimum value these contacts will close and short-out the resistor 67 so as to apply full line voltage to the armature 37A of the motor 37 and cause an acceleration in the speed of rotation thereof.

The governing mechanism 53 is preferably arranged so that the speed of rotation of the motor 37 at which the contacts 53c close is of very nearly the same value as the speed at which these contacts open so that the motor 37 is caused to operate at a substantially constant speed due to very rapid opening and closing of the contacts 53c, tending to very rapidly accelerate and deaccelerate the speed of rotation of the motor 37 and thereby maintain an essentially constant average speed of rotation.

We also provide a capacitor 68 connected in shunt relationship with the contacts 53c so that inductive discharges occasioned by the opening of these contacts may be absorbed to prevent undue arcing and burning of these contacts.

The speed of the motor 37 is accelerated whenever the crater 36 recedes from its predetermined location a distance sufficient to increase the intensity of illumination on the photo-electric device 58 and energize a sensitive relay SR associated therewith which in turn energizes a control relay CR so as to short-circuit the speed regulating resistor 67. These connections include a pair of conductors 69 and 70 which connect the photo-electric device 58 to the coil of the sensitive relay SR. The photo-electric device 58 is preferably of a well known type which generates an electric potential, the magnitude of which is proportional to the amount of light impinging on the photo-electric device 58.

Normally open contacts SRa of the sensitive relay SR are included in a circuit 71 which extends between the conductors L1 and L2 and includes the coil of the control relay CR. Normally open contacts CRa of the control relay CR are included in a circuit 72 which parallels the speed controlling resistor 67 so as to provide a direct connection between the conductor L1 and the armature of the motor 37 whenever this relay is energized. A discharge resistor 73 is connected by means of a conductor 74 in parallel with the contacts SRa to prevent undue arcing and burning of these contacts.

Summarizing briefly, the motor 37 normally operates at a constant speed controlled by the governor mechanism 53 at a value lower than that required to feed the electrode 14 forwardly at the same rate as it is consumed by the arc. The crater 36 thereof gradually recedes from the light projecting means and causes an increase in the amount of light impinging on the photoelectric device 58. This increase in the quantity of light causes an increase in the potential generated by the photo-electric device 58 and energizes the sensitive relay SR and in turn the control relay CR so as to short-out the speed limiting resistor 67 and cause the motor 37 to rotate at a speed higher than its governed speed. The high speed operation of the motor 37 will thereupon cause the electrode 14 to be advanced at a rate higher than its rate of consumption and thus advance the crater 36 toward the light projecting means. This re-advance of the crater 36 will decrease the amount of light falling upon the photo-electric device 58 and cause the reverse operation of the relays associated therewith so that the speed of the motor 37 is again reduced to the value maintained under normal conditions by the governing mechanism 53. The electrode 14 is therefore fed continuously forward by the motor 37, the speed of feeding being accelerated from time to time to maintain the crater 36 in a substantially fixed location relative to the light projecting means.

It is desirable that this fixed location of the crater 36 relative to the light projecting means may be suitably adjusted, and we accordingly provide means therefor which is manually operable to shift the slit 64 transversely of the control beam of light. We also incorporate with this means a mechanism for adjusting the area of the slit 64 to regulate the maximum amount of light which may be transmitted therethrough.

These control devices are illustrated in Fig. 5 and include a bracket member 75 secured to the lamp housing 57 and adapted to slidably support the masking plate 63 for translatory movement transversely of the control beam of light. Translatory motion may be imparted to the masking plate 63 and the slit 64 therein by means of a control knob 75a coupled to a feed screw 75b which coacts with the lamp housing 57 and a nut 75c secured to the masking plate 63 to move said masking plate 63 transversely in said guide bracket 75 whenever the control knob 75a is rotated. A shift in the position of the slit 64 caused in this manner will alter the location which must be assumed by the crater 36 in order to cause the control beam of light therefrom to pass through the slit 64 and impinge on the photo-electric device 58 to actuate the controls in the manner previously described.

In order that operation of the previously described control knob 65 will adjust the area of the slit 64 to regulate the sensitivity of response of the photo-electric device 58, we secure the knob 65 to a feed screw 76 which is rotatably supported by a bracket 76a attached to the masking plate 63. The feed screw 76 coacts with the bracket 76a and a nut 76b secured to a gate 76c which is slidably guided for movement over the slit 64 by means of guides 76d so as to move the gate 76c to obscure more or less of the slit 64 as the knob 65 is rotated. It is readily understood that adjustment of the area of the slit 64 also adjusts the sensitivity of response of the photo-electric device 58 since a change in the area of said slit requires that the image of the crater 36 move a greater or less distance (depending upon whether the slit area is increased or decreased) into the slit 64 to transmit the same amount of light to the photo-electric device 58 as was transmitted before the slit area was changed.

It will be readily understood by those skilled in the art that should it for any reason be found unnecessary to rotate the electrode 14 in order to maintain a symmetrical form of the crater 36, the means for rotating said electrode may be disconnected or omitted and the speed of the feeding motor 37 and the gear ratio of the mechanical connection between the motor 37 and the feeding wheels 47—48 may be accordingly changed to provide the proper rate of feed for the electrode 14 as defined hereinbefore.

Referring again to Fig. 1, we have illustrated therein an externally operable mechanism for effecting the release of the electrode 14 from the elctrode feeding wheels 47 and 48. This mechanism may be constructed in accordance with the details disclosed in a co-pending application, Serial No. 227,142, filed August 27, 1938, by Fielding C. Coates, which has matured into United States Letters Patent 2,174,736 on October 3, 1939, and includes a slidable sleeve 77 which is disposed between the sleeve 15 and the electrode 14 and carries at its forward end a wedging member 78 adapted to engage rollers 79 and 80 mounted upon the ends of the axles 49 and 50 so as to wedge these axles apart and free the feeding wheels 47 and 48 from the electrode 14 whenever the wedging member 78 is moved rearwardly. This rearward movement of the wedging member 78 may be accomplished by the inter-action of a cam and lever arrangement 81—82 with a collar 83 secured to the rearward end of the slidable sleeve 77.

To facilitate the assembly of the mechanism previously described, we provide a hinged cover 84 for the gear housing 11 which may be hingedly supported on the housing 11 by means of a hinge pin 85 and an opening 86 in the rearward end of the gear housing 11. In order to reduce the tendency for carbon dust, dirt, and other foreign material to enter into this opening and in order to facilitate the insertion of new positive electrodes 14, we provide a funnel-shaped bushing 87 which is adapted to be secured in and partially fill the opening 86.

We also provide a mechanism or heat shield for conducting the heat generated in the arc away from the control and feeding apparatus and which includes also means for cooling the body portion of the electrode 14. The heat shield includes a water jacket 88 which may be formed of cast material and secured to the housing 11 by means of bolts or studs 88a, 88b and 88c. The water jacket 88 is provided with water circulating passages 89, 90, 91 and 92. Cooling water is supplied through a suitable water supply connection 93 communicating with the water passage 89 and is discharged through a water outlet (not shown) communicating with the water passage 92. As best shown in Fig. 3, the cooling water preferably enters by means of the water supply connection 93, travels laterally through the interconnected circulating passages 89, 90, 91 and 92 in sequence and absorbs the heat from the water jacket 88 and the mechanism connected thereto.

A means is provided for conducting the power current from the external source to the electrode 14 which includes a pair of electrode brushes 94 and 95 enclosed by the water jacket 88 and disposed on either side of the electrode 14 and slidably mounted in guides 96 formed in the water jacket 88 and retained in these guides by means of a cover plate 97 secured to the water jacket 88 as by means of screws 98.

We provide a manually operable adjusting means for adjusting the location of the brush 94 relative to the electrode 14 so that the position of the brush 94 may be varied at will to accommodate varying sizes of electrodes 14. This adjusting mechanism includes an adjusting nut 99 which is threadedly engaged with a boss 100 secured to the water jacket 88 and is provided with a flange portion 101 which may be engraved with suitable indicia referring to various sizes of the electrodes 14.

In order that manual rotation of the adjusting nut 99 to the various positions indicated by the indicia engraved on the flange 101 may move the brush 94 inwardly or outwardly with respect to the electrode 14, we provide an adjusting rod 102 which engages a bearing surface or bolt head 103 on the brush 94 and is coupled to the adjusting nut 99 by means of an adjusting screw 104 threadedly engaged with the nut 99 and locked in position by means of a lock nut 105. A compression spring 106 is confined in a recess 107 provided in the exterior end of the boss 100 and forces the adjusting nut 99 away from the adjusting rod 102 so as to maintain a frictional engagement in the threaded connection of the nut 99 and the boss 100 to prevent accidental rotation thereof. It will be seen that rotation of the adjusting nut 99 will cause it and the adjusting rod 102 to move inwardly toward the electrodes 14 or outwardly away therefrom so as to place the brush 94 in different positions corresponding to varying diameters of the electrode 14.

We prefer to form the electrode contacting face of the brush 94 as a plane surface disposed parallel to the axis of the electrode 14 and the electrode contacting end of the brush 95 as a V shaped notch 108, so that the inter-action of the brushes 94 and 95 bearing against the electrode 14 will operate to hold the electrode 14 in a centered relationship relative to its axis of rotation.

We provide a means for yieldably forcing the brush 95 into contact with the electrode 14 which includes a lever 109 pivotally mounted to the gear housing 11 and carrying a forked end 110 which encompasses a stud 111 attached to the outer end of the brush 95. A pair of inwardly extending pins 112 and 113 are carried by the forked end 110 and engage an annular groove 114 which is provided on the exterior portion of the stud 111. The lever 109 is urged in a counter-clockwise direction, as viewed in Fig. 2, by means of a compression spring 115 which is confined between the side of the gear case 11 and the other end of the lever 109 by means of washers 116 carried by a pin 117, suitably insulated from lever 109, so as to force the brush 95 into yielding engagement with the electrode 14.

It is apparent, of course, that if a spent electrode 14 is removed, the brush 95 may move inwardly a distance sufficient to block the opening in the water jacket 88 provided for the electrode 14 so as to prevent the insertion of a new electrode. We therefore provide a handle portion 118 on the lever 109 to allow the operator to manually rotate the lever 109 to move the brush 95 outwardly to permit the insertion of a fresh electrode.

In order that the power for the arc lamp may be suitably connected to the brushes 94 and 95, we provide for the brush 94 a flexible electrical conductor 119 which is preferably maintained in intimate electrical contact with the brush 94 by means of the previously described bearing surface or bolt head 103. The conductor 119 extends to the exterior of the water jacket 88 where it may be suitably secured to the body portion of the water jacket 88 by means of a terminal bolt 120 so as to provide attachment to an electrical supply conductor.

In a similar manner we provide for the brush 95 a flexible electrical conductor 121 which is electrically connected to the brush 95 by means of the stud 111 and which extends exteriorly of the water jacket 88 and is suitably secured to the body portion of the water jacket 88 as by means of a terminal bolt 122. The conductors 119 and 121 may be inter-connected electrically by means of an external jumper (not shown) connected between the terminal bolts 120 and 122 so that a power supply conductor may be connected to either of these terminal bolts.

In order that the length of travel of the brushes 94 and 95 in the guides 96 may be limited to a reasonable value so as to avoid the imposition of unnecessary strains upon the flexible conductors 119 and 121, we provide each of the brushes 94 and 95 with a dowel-pin 124, the exposed ends of which slide is short slot-like recesses 125 provided in the body portion of the water jacket 88 so that the travel of the brushes 94 and 95 will be limited to the length of the slots or recesses 125.

We provide a negative electrode 126 for the arc lamp and support it on a negative electrode supporting structure 127 in such a manner that its axis may be adjusted in position relative to the axis of the positive electrode 14 through the employment of a carriage 128 slidably carrying the supporting structure 127 and slidably supported by the base 10. An extension portion 129 of the base plate 10 slidably supports the carriage 128 on ways 130 which may be similar in shape and construction to the ways employed on the beds of lathes, or other machine tools for slidably supporting the carriages thereon. In order that the carriage 128 may be adjusted in its position along the ways 130, we provide a threaded shaft 131 which is secured to the carriage 128 by means of a set screw 132 and which carries an internally threaded bevel gear 133 threaded upon the rod 131. The bevel gear 133 is provided with a hub portion 134 arranged to contact a downwardly depending flange portion 135 of the base extension 129 and a sleeve, or spacer member 136 which encircles the rod 131 and bears against the face of the bevel gear 133 and another downwardly depending flange 137 formed on the base extension 129 so that lateral motion of the bevel gear 133 along the shaft 131 will be prevented in one direction by the engagement of the hub portion 134 thereof with the flange 135 and will be prevented in the opposite direction by the engagement of the sleeve 136 with the face of the gear 133 and the flange 137.

Rotation of the bevel gear 133 will therefore cause the shaft 131 to move relative to the base extension 129 and slide the carriage 128 in the ways 130 so as to provide a longitudinal adjusting movement to the negative electrode 126 supported thereby. An externally operable remote control means (not shown) is preferably provided which includes a bevel gear (not shown) engaging the bevel gear 133 so that the previously described adjustment may be accomplished by performing the required operation exteriorly of the lamp housing 57.

In order that a similar adjustment of the position of the negative electrode 126 may be made in a direction transverse to the axis of the positive electrode 14, we slidably secure the negative electrode supporting structure 127 to the carriage 128 by means of ways 138 so that it may be moved therealong by rotation of a feed screw 139 carried by the supporting structure 127 and engaging a nut 140 carried by the carriage 128. The feed screw 139 is also preferably extended exteriorly of the lamp housing 57 in any suitable manner so that such adjustments afforded by this means may be readily made.

The supporting structure 127 includes a negative electrode holder 141 which is slidably mounted upon guide rods 142 extending between upper ends of the arm portions of an angularly disposed U shaped portion 143. A portion 144 of the negative electrode holder 141 is secured to a lower portion 145 thereof in any suitable manner and electrically insulated therefrom by insulating material 146. The portion 144 carries an electrode clamping device which may include a suitable electrode receiving recess 147 and an electrode clamping screw 148 cooperating therewith to secure the electrode 126 in the recess 147. An electrical terminal 149 is provided for the attachment of an incoming power line conductor.

In order that the negative electrode feeding mechanism may be protected from the intense heat generated in the arc, we provide an insulating guard 150 which is secured to the arm of the U shaped portion 143 which is disposed nearest the arcing end of the negative electrode 126. The insulating guard 150 may be constructed of a refractory or heat insulating material, such as asbestos or its compounds.

A means for moving the negative electrode holder 141 upwardly along the guide rods 142 is provided for maintaining constant length of arc established between the negative electrode 126 and the positive electrode 14 which includes a reversible electric motor 151 (not shown except in the wiring diagram, Fig. 4) mounted in any suitable location on the base plate 10 or the extension 129 thereof and mechanically connected to the negative electrode holder 141 through a shaft 152 rotatably supported by the electrode supporting structure 127. The shaft 152 is disposed at the lower end of the electrode supporting structure 127 and bears a sprocket 153 secured thereto so as to be rotated thereby. An endless chain 154 extends about the sprocket 153 and about another sprocket 155 rotatably supported by a shaft 156 secured to the upper end of the electrode supporting structure 127 so that rotation of the shaft 152 will also cause a rotation of the endless chain 154.

We provide a depending tooth 157 on the lower portion 145 of the negative electrode holder 141, the tooth 157 being so disposed as to be engaged by the upper half of the endless chain 154 so that movement of the upper portion of the endless chain 154 will cause the electrode holder 141 to be moved along the guide rods 142.

The manner in which the motor 151 cooperates with other previously described equipment to maintain the desired arc conditions may best be understood by reference to the wiring diagram, Fig. 4. The arc lamp is connected to a suitable source of power by means of the line conductors L1 and L2. The line L1 is preferably connected directly to the positive electrode 14, while the line L2 is connected to the negative electrode 126 through a suitable ballast resistor 158 by means of a conductor 159.

The reversible electric motor 151 is connected in a bridge circuit in such fashion that the motor 151 will operate to maintain the resistance of the arc at any desired value. A field 151F of the motor 151 is connected in a circuit 160 which extends between the line conductors L1 and L2 and includes an adjustable field rheostat 161, and an armature 151A of the motor 151 is connected as the balance responsive device in a bridge circuit comprising the arc circuit L1—159—L2, and a reference circuit 162 which extends between the conductors L1 and L2 and includes a tapped resistor AR. The armature 151A is connected in a circuit 163 which extends between the previously described conductor 159 and an adjustable tap provided on the resistor AR.

In order to simplify the description of the operation of this bridge circuit, we assign the reference character R1 to that portion of the resistor AR which comprises one reference resistor lying on one side of the tap connected to the circuit 163 and the reference character R2 to that portion of the resistor AR which comprises another reference resistor lying on the opposite side thereof. As is well known to those skilled in the art, whenever the ratio of resistance of the reference resistors R1 to R2 equals the ratio of resistance between the arc resistance and the resistance of the ballast resistor 158, no potential will be applied across the armature 151A, but whenever these resistance ratios vary, a voltage will be applied across the armature 151A and current will flow through circuit 163.

Inasmuch as the resistance of the arc is a variable quantity depending upon the length of the arc which in turn may vary in terms of the rate of consumption of the electrodes 14 and 126 and the rate at which they are fed toward each other, it will be seen that although the bridge circuit just described may be initially balanced so as to provide a zero potential on the armature 151A, this balanced condition will soon be upset by the lengthening of the arc as the electrodes 14 and 126 are consumed. The ratio of the arc resistance to the resistance of the ballast resistor 158 will therefore be larger than the ratio of the resistance of the reference resistor R1 to the resistance of the reference resistor R2 so that a potential is applied across the terminals of the motor armature 151A and cause the motor 151 to revolve. We prefer to arrange the relative polarities of the field and armature of the motor 151 and the gearing connecting the motor 151 to the shaft 152 in such fashion that the motor 151 will rotate in such direction as to re-establish a balanced condition of the previously described bridge circuit.

Rotation of the motor 151 will therefor advance the negative electrode 126 toward the positive electrode 14 and the reduction in the length of arc thus caused will reduce the arc resistance and cause the ratio of arc resistance to the resistance of the ballast resistor 158 to approach equality with the ratio of the resistance of R1 to R2. As soon as equality between these ratios is re-established, current will cease to flow through the armature 151A and the motor 151 will stop feeding the negative electrode 126 toward the positive electrode 14. Conversely, if the bridge circuit is unbalanced due to the arc length being too short, the current will flow through the armature 151A in a direction opposite to that just described so as to cause the reversible motor 151 to rotate in the opposite direction and cause separation of the electrodes and an increase in the length of the arc.

It is therefore apparent that the feeding mechanism for the negative electrode 126 and the controls therefor operate in such a fashion as to maintain the length of arc established between the electrodes 126 and 14 at a constant value. It is further apparent that the length of this arc and consequently its resistance is determined by the ratio of the references resistors R1 and R2, and that by moving the point of attachment of the circuit 163 to the resistor AR so as to vary the ratio between the resistors R1 and R2, the length of the arc which will be maintained by this feeding and control mechanism may be adjusted at will. Variations in the power used by the arc and by the ballast resistor 158 are caused solely by changes in the resistance of the arc when it is connected to a constant potential supply so that the feeding controls just described therefore operate to adjust and maintain the power used at a constant value.

The mechanism just described also operates to strike the arc when the lamp is first connected to the power supply. Until such time as the arc is established between the electrodes 14 and 126, the arc resistance is substantially infinite and the feeding motor 151 is accordingly energized in such fashion as to shorten the arc as soon as the lamp is connected to the supply lines. As soon, however, as the electrodes are brought into contact with each other, the arc resistance decreases instantly to a value much lower than that for which the feeding controls are set and the feeding motor 151 is immediately reversed to draw the electrodes apart and thus strike the arc.

It will be noted that by incorporating in a projection type arc lamp the mechanisms and controls as described hereinbefore, we have provided a means for maintaining the arc thereof at a constant length and resistance so as to maintain a uniform quality and quantity of illumination by regulating the power used in the arc, and have provided means also for rotating the positive electrode so as to maintain a symmetrical crater in the end thereof, together with means for automatically feeding the positive electrode in such a fashion that the crater thereof is continuously maintained at an optimum location relative to the optical system employed in the lamp.

While we have shown and described the preferred embodiment of our invention, we do not desire to be limited to any of the details of construction shown or described herein, except as defined in the appended claims.

We claim:

1. In an arc lamp employing a pair of electrodes which are progressively consumed by an electric arc established between arcing ends thereof, the combination of: a ballast resistor; an arc circuit connecting said electrodes and said ballast resistor in series relationship to a source of power; a pair of reference resistors; a reference circuit connecting said reference resistors in series relationship across said arc circuit; an electromotive feeding means for feeding said electrodes toward each other; and a control circuit connecting said electromotive feeding means between a point in said reference circuit common to both of said reference resistors and a point in said arc circuit common to one of said electrodes and said ballast resistor whereby said electromotive feeding means operates as a balance responsive element in a Wheatstone bridge circuit to strike said arc and to maintain the length of said arc at a substantially constant value.

2. In an arc lamp employing a rotating electrode, the combination of: a frame; an electrode holder for loosely rotatably supporting said electrode on said frame; a pair of electrode brushes slidably mounted on said frame and disposed on opposite sides of said electrode for engagement therewith to conduct an electric current thereto; a non-yieldable, manually operable means for sliding one of said brushes into non-yielding contact with said electrode; and a resilient means for yieldably sliding said other brush into contact with said electrode and for forcing said loosely supported electrode against said first non-yieldable brush.

3. In an arc lamp employing a rotating electrode, the combination of: a frame; an electrode holder for loosely rotatably supporting said electrode on said frame; a pair of electrode brushes slidably mounted on said frame and disposed on opposite sides of said electrode for engagement therewith to conduct an electric current thereto; a non-yieldable manually operable means for sliding one of said brushes into non-yielding contact with said electrode; a resilient means for yieldably sliding said other brush into contact with said electrode and for forcing said loosely supported electrode against said first non-yieldable brush; and a guide means forming a part of said yieldably slided brush for guiding the rotation of said loosely supported electrode.

4. In an arc lamp employing a rotating electrode, the combination of: a frame; an electrode holder for loosely rotatably supporting said electrode on said frame; a pair of electrode brushes having an elongated electrode contacting surface for conducting an electric current to said electrode; means slidably supporting said brushes upon said frame and disposing said brushes on opposite sides of said electrode near an arcing end thereof; a non-yieldable manually operable means for sliding one of said brushes into non-yielding contact with said electrode; a resilient means for yieldably sliding said other brush into contact with said electrode and for forcing said loosely supported electrode against said first non-yieldable brush; and a guide means forming a part of said yieldably slided brush for guiding the rotation of said loosely supported electrode.

5. In an arc lamp employing a rotating electrode, the combination of: a frame; an electrode holder for loosely rotatably supporting said electrode on said frame; an electrode brush having an elongated plane electrode contacting surface for conducting an electric current to said electrode; another electrode brush having a pair of elongated plane electrode contacting surfaces disposed angularly relative to each other; means slidably supporting said brushes upon said frame and disposing said brushes on opposite sides of said electrode near an arcing end thereof; a non-yieldable manually operable means for sliding said first named brush into non-yielding contact with said electrode; and a resilient means for yieldably sliding said other brush into contact with said electrode and for forcing said loosely supported electrode against said first non-yieldable brush, whereby the three elongated plane electrode contacting surfaces operate to guide the rotation of said loosely supported electrode.

PETER MOLE.
ELMER C. RICHARDSON.
FIELDING C. COATES.